United States Patent [19]

Shaw et al.

[11] Patent Number: 4,461,536

[45] Date of Patent: Jul. 24, 1984

[54] FIBER COUPLER DISPLACEMENT TRANSDUCER

[75] Inventors: Herbert J. Shaw, Stanford; Michel J. F. Digonnet, Menlo Park, both of Calif.

[73] Assignee: Board of Trustees of Leland Stanford Jr. University, Stanford, Calif.

[21] Appl. No.: 300,956

[22] Filed: Sep. 10, 1981

[51] Int. Cl.³ .............................................. G02B 5/172
[52] U.S. Cl. .................................. 350/96.15; 73/800; 350/96.29; 356/399; 367/140
[58] Field of Search ............... 350/96.15, 96.16, 96.29, 350/96.30; 356/399–401; 73/655, 800, 769, 770; 367/140

[56] References Cited

U.S. PATENT DOCUMENTS

| | | | |
|---|---|---|---|
| 4,294,513 | 10/1981 | Nelson et al. | 350/96.29 |
| 4,295,738 | 10/1981 | Meltz et al. | 73/800 X |
| 4,302,071 | 11/1981 | Winzer | 350/96.15 X |
| 4,307,933 | 12/1981 | Palmer et al. | 350/96.16 |
| 4,315,666 | 2/1982 | Hicks, Jr. | 350/96.15 |
| 4,360,247 | 11/1982 | Beasley | 350/96.15 |
| 4,421,384 | 12/1983 | McMahon | 350/96.29 |

FOREIGN PATENT DOCUMENTS

| | | | |
|---|---|---|---|
| 52-24539 | 2/1977 | Japan | 350/96.15 |
| 54-101334 | 8/1979 | Japan | 350/96.15 |

*Primary Examiner*—John D. Lee
*Attorney, Agent, or Firm*—Knobbe, Martens, Olson & Bear

[57] ABSTRACT

A transducer for the measurement of minute displacements incorporates a fiber optic coupler having a coupling efficiency which varies in relation to the relative position of coupler elements. The transducer may also be used indirectly as an accurate sensor of physical parameters, such as temperature and pressure, through the use of a secondary transducer which provides a displacement proportional to such physical parameter. The outputs from the fiber optic coupler may be compared to provide a measure of the coupling efficiency, and may be monitored by a display which provides a direct measurement of displacement or a secondary physical parameter.

21 Claims, 9 Drawing Figures

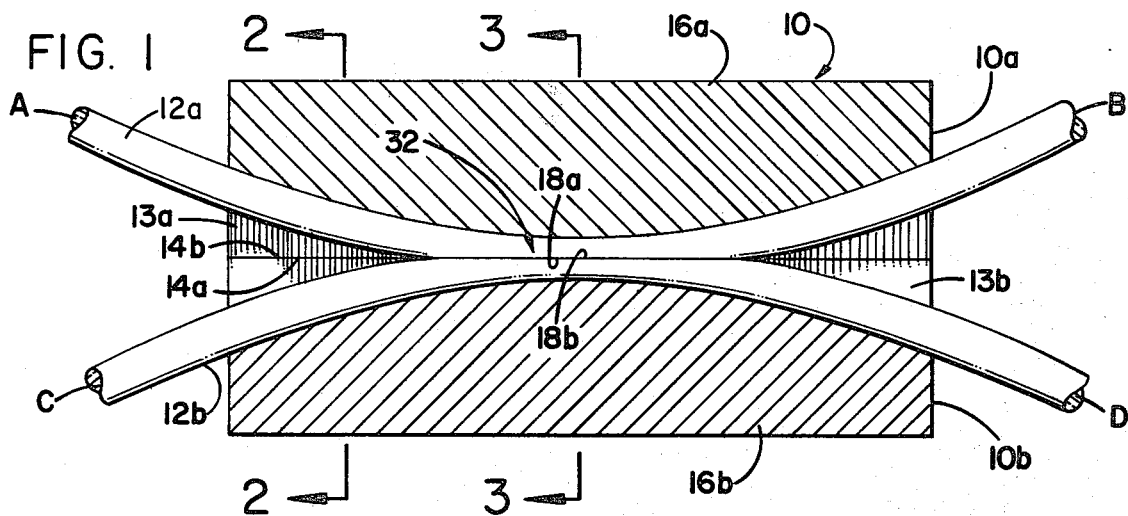
FIG. 1
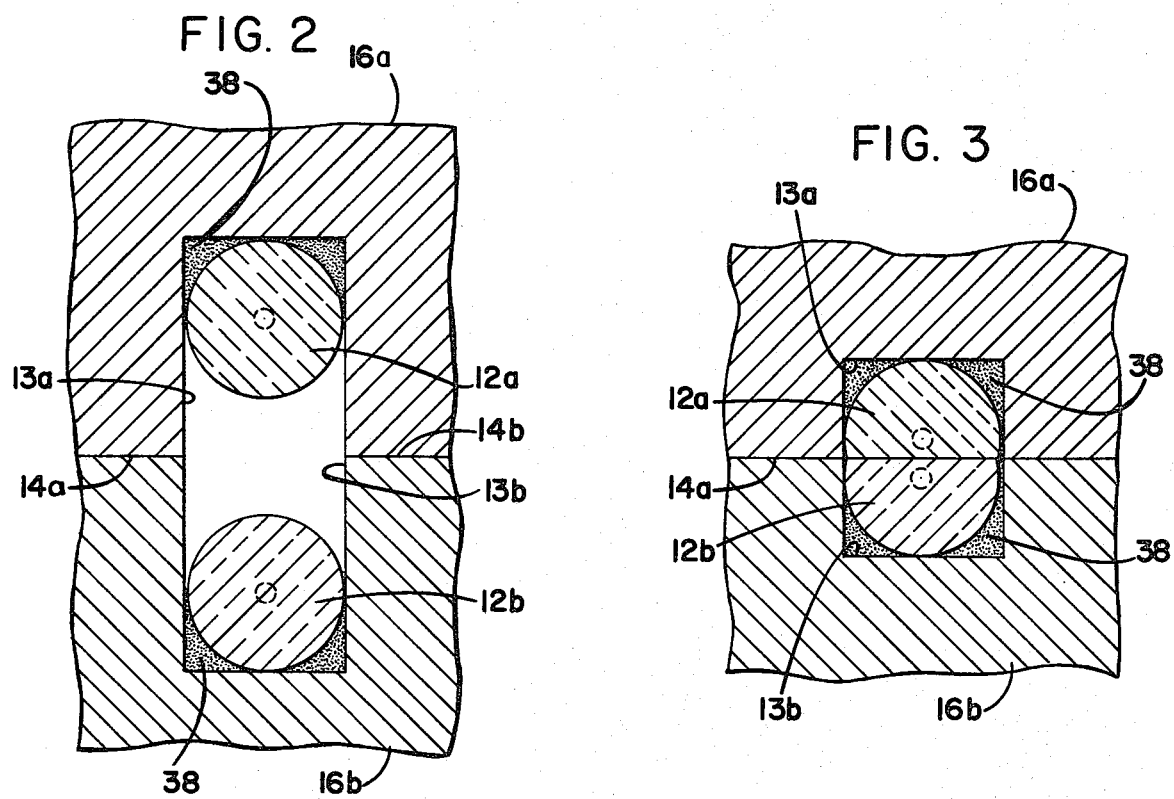
FIG. 2
FIG. 3
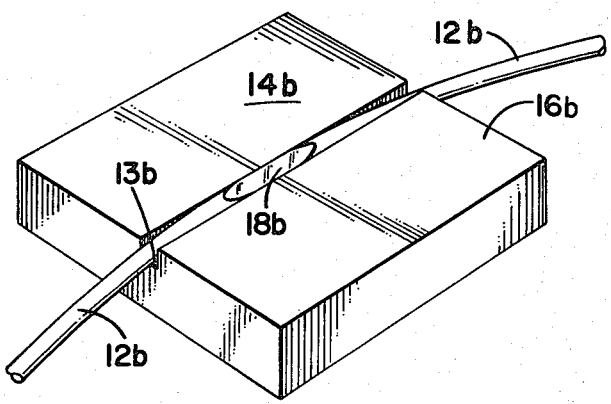
FIG. 4

FIBER COUPLER DISPLACEMENT TRANSDUCER

BACKGROUND OF THE INVENTION

This invention relates to transducers used for the measurement of minute displacement, e.g., in the range of several microns or less with precise accuracy. The application also relates to the indirect measurement of other physical parameters, such as temperature and pressure, through the use of a secondary transducer which provides a displacement proportional to the temperature or pressure to be measured. The application relates to the measurement of such physical parameters with extremely high resolution over a relatively small dynamic range, or over a correlated group of dynamic ranges.

The most successful, prior, high resolution displacement transducer known to applicant is a linear variable differential transducer which comprises a transformer having a primary coil and two secondary coils symmetrically spaced on a cylindrical form. A free moving, rod-shaped magnetic core inside the coil assembly provides a path for the magnetic flux linking the coils. When the primary coil is energized by an external source, voltages are induced in the two secondary coils. Typically, these secondary coils are connected as an opposed series circuit so that the two induced voltages, are of opposite polarity. Thus, the net output of the transducer is the difference between these two voltages which is zero when the core is at the center or null position in the transducer. When the core is moved from the null position, the induced voltage in the coil toward which the core is moved increases, while the induced voltage in the opposite coil decreases. This action produces a differential voltage output which varies linearly with changes in core position. The sign of the output voltage changes as the core is moved from one side of null to the other.

Such transducers provide isolation between the electrical circuit and the element whose displacement is being measured, and offer wide temperature range operation, long mechanical lifetime, high sensitivity with low drift and linearity over a broad dynamic range. For example, the sensitivity of such devices provides a minimum measureable displacement as low as 0.02 microns. Other such devices may have a linear range as high as 10 inches.

While such transducers have low susceptibility to hostile chemical and thermal environments, their electromagnetic nature makes them relatively susceptible to electrical and magnetic interference, so that their use in a hostile electromagnetic environment may be prohibited. Furthermore, the dynamic range of a particular transducer, once the transducer has been manufactured, is predetermined, as a trade-off against high resolution, so that a particular transducer may not be used for a variety of applications.

Finally, while the resolution of such transducers is relatively high, certain applications may require measurement of displacements smaller than 0.02 microns and, to date, electromagnetic devices have not been constructed with a higher resolution.

SUMMARY OF THE INVENTION

The present invention utilizes the sensitivity of a fiber optic coupler to mechanical displacement of its coupler elements as the basis for an extremely high resolution, non-electromagnetic displacement transducer.

More specifically, applicant has found that the coupling coefficient of single mode fiber optic couplers is predictably variable in response to mutual displacement of the fiber optic elements which make up the coupler, particularly when these elements are moved in a direction perpendicular to the fiber optic longitudinal axis. Furthermore, because in single mode fiber optic couplers, plural orders of coupling are achievable when the core members are closely spaced (a condition known as "overcoupling"), a family of dynamic ranges are possible for a displacement transducer based upon such couplers. Each of the ranges within the family may have a relatively high resolution, so that a single coupler may be used for measurements over different ranges, with different sensitivities, but with each range having a higher resolution than would be possible if the entire range of the family were covered by a single dynamic range.

In a specific configuration for utilizing a fiber optic coupler for displacement measurement, a single mode fiber optic coupler using evanescent field coupling is provided with a pair of fiber optic elements mounted in a face-to-face configuration within a pair of relatively moveable bases or substrates. One of these substrates is rigidly mounted in a measurement vice and the second substrate is attached to an element whose movement is to be measured. As the second substrate, and its associated fiber optic member, is displaced relative to the stationary substrate, the coupling efficiency of the fiber optic coupler is altered, with a high degree of sensitivity to minute substrate movements.

By supplying light to the coupler input and utilizing photo-detectors on the primary and secondary coupler outputs, the ratio of light at these outputs may be measured. This ratio may be directly transformed into a measurement of displacement of the moveable fiber optic substrate relative to the stationary substrate. Furthermore, by attaching the moveable substrate to an object whose displacement is to be measured, a direct reading of displacement with a high degree of accuracy and repeatability is possible, even in a hostile electromagnetic environment.

The displacement transducer of the present invention may also be used to measure the frequency and/or amplitude of mechanical vibrations. Moreover, using a secondary transducer, such as a material having known thermal expansion characteristics, the displacement transducer may be used indirectly to measure temperature. Likewise, it has been found that, by using other secondary transducers, such as materials having a known compressability, the displacement transducer of this invention may be used as a pressure sensor. Other physical properties may likewise be measured, so long as secondary transducers can be found to provide a displacement which varies in accordance with such properties.

These and other advantages of the present invention are best understood through reference to the drawings, in which:

FIGS. 1 through 4 are identical to FIGS. 1 through 4 in the co-pending patent application described below which is incorporated herein by reference. These figures include:

FIG. 1 is a cross-sectional view of the fiber optic coupler used in the present invention;

Figure 5:
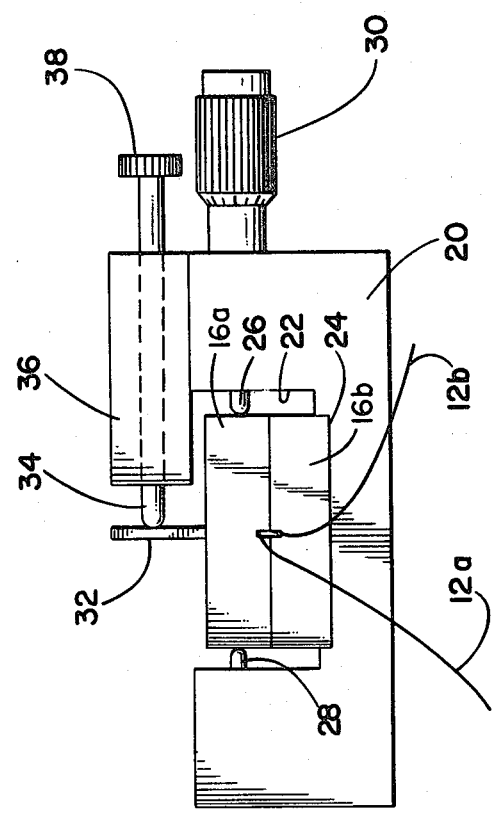
Figure 6:
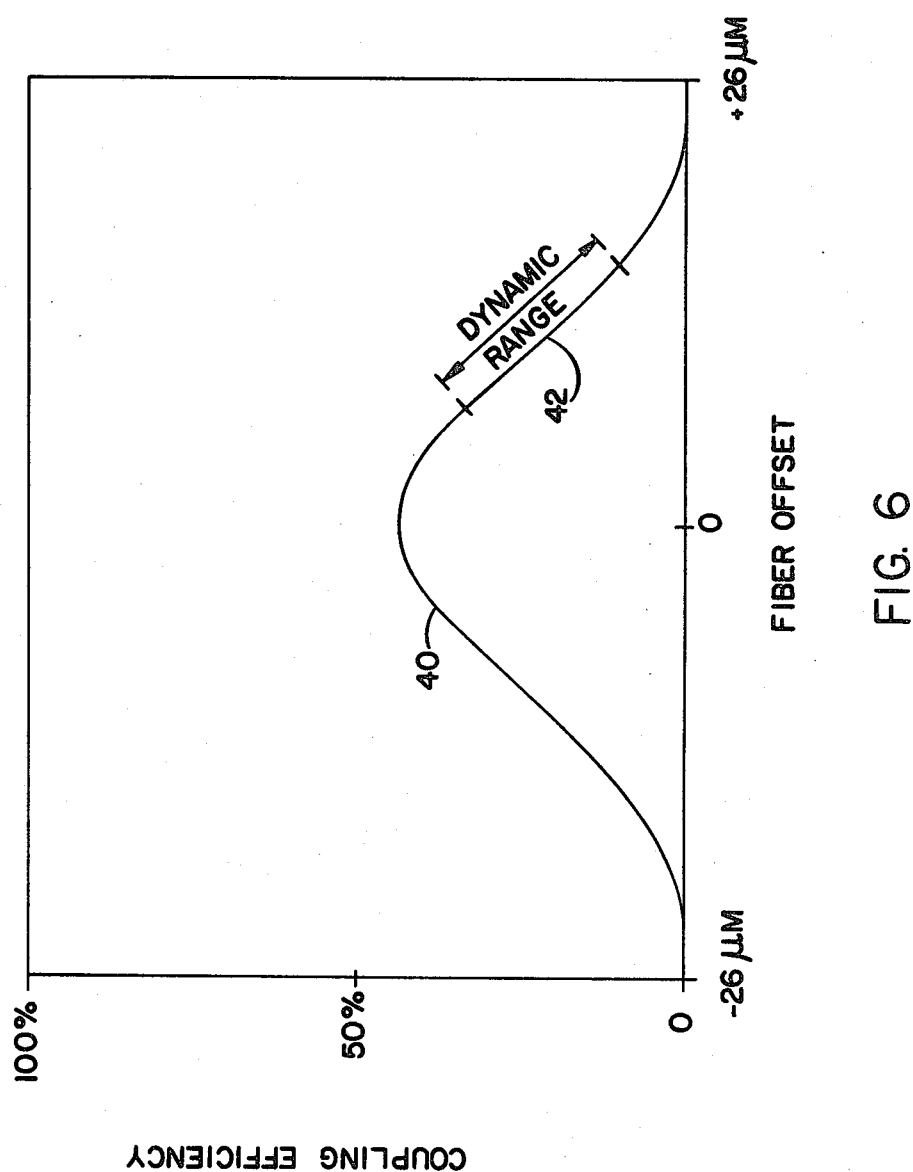
Figure 7:
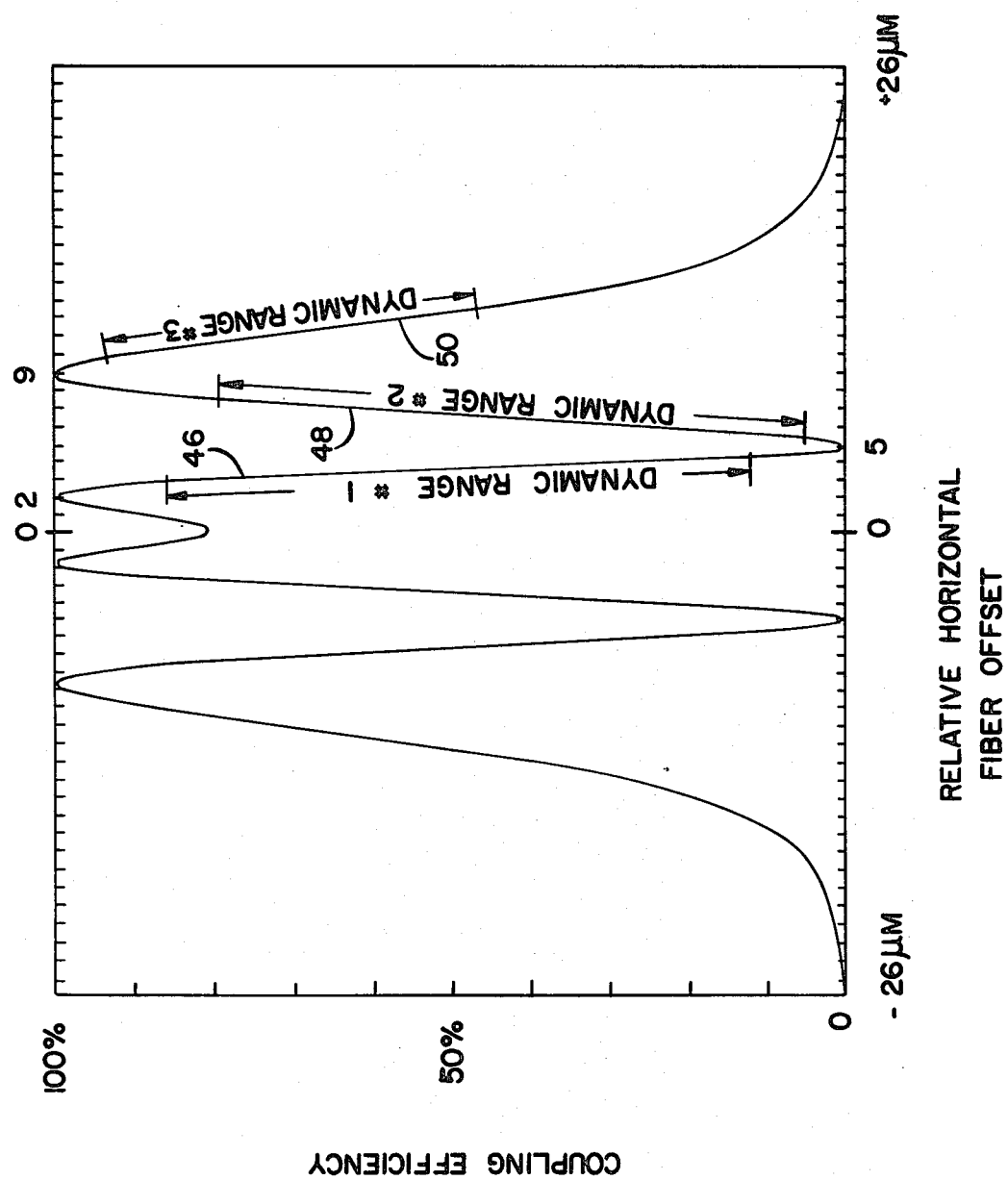
Figure 8:
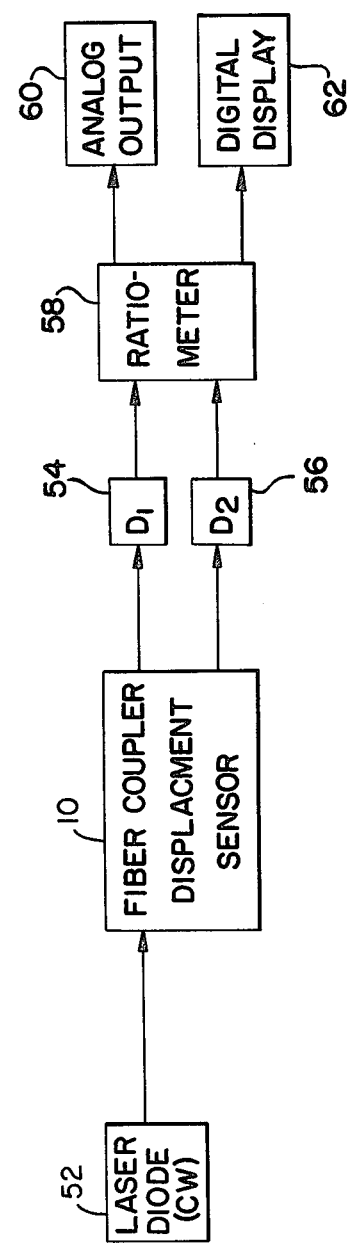
Figure 9:
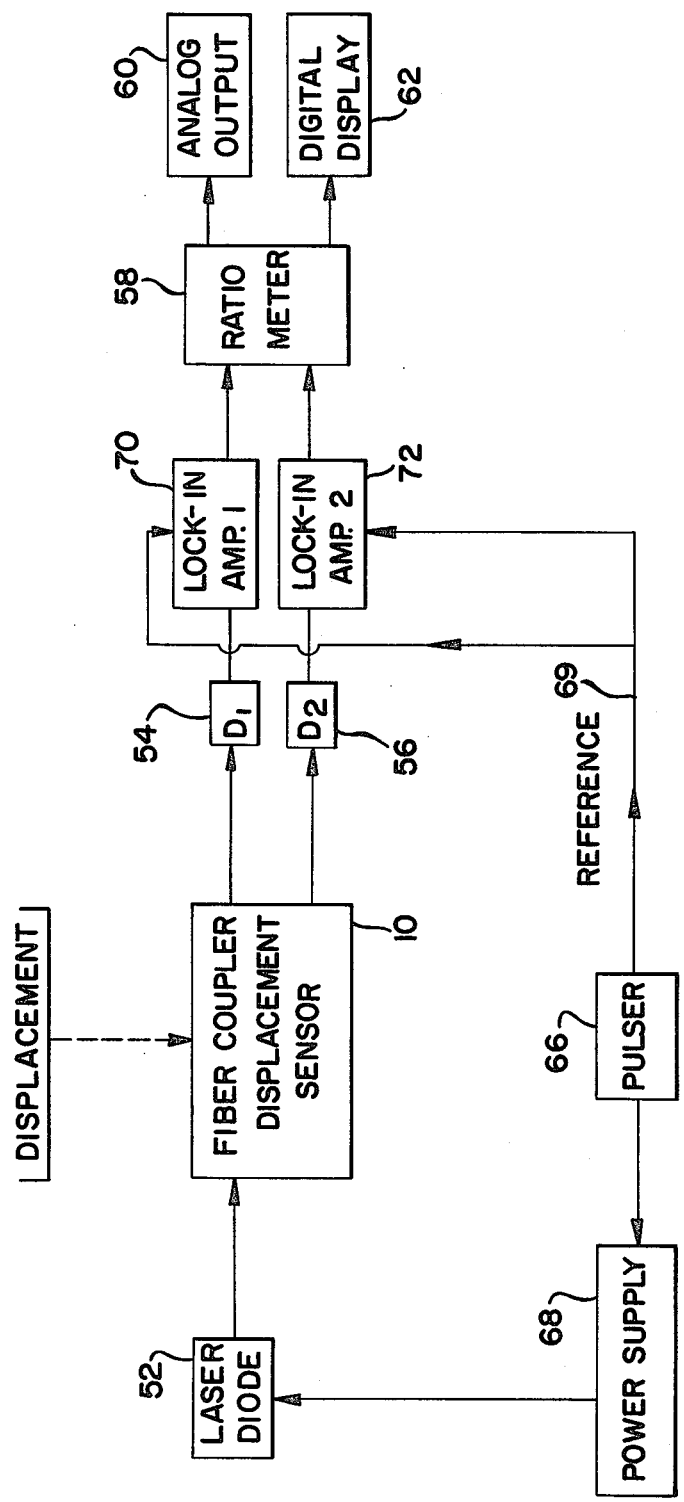

FIGS. 2 and 3 are cross-sectional views of the coupler of FIG. 1, taken along lines 2—2 and 3—3, respectively;

FIG. 4 is a perspective view of one element of the coupler of FIG. 1, separated from the other element thereof to show the configuration of the confronting face of said element;

FIG. 5 is an elevation view of a test assembly, including the fiber optic coupler, shown in FIG. 1, for measuring displacement;

FIG. 6 is a graph showing the theoretical coupling efficiency of of a coupler plotted as a function of the horizontal displacement of the optical fibers thereof; and FIG. 7 is a plot similar to the plot of FIG. 6, but showing a second theoretical fiber optic coupling curve for a fiber optic coupler having a core spacing smaller than that shown in FIG. 6 to generate a family of dynamic ranges for the displacement transducer;

FIG. 8 is a schematic diagram of an electrical circuit used for measuring the coupling efficiency of the coupler within the test assembly of FIG. 5 to provide a measurement of displacement;

FIG. 9 is a schematic block diagram of an alternative electrical system for use in place of the electrical circuit of FIG. 8 for higher resolution measurements of displacement.

DETAILED DESCRIPTION OF THE PREFERRED EMBODIMENT

Referring initially to FIGS. 1 through 4, a fiber optic coupler is shown which provides the transducing element of the displacement transducer of the present invention. This fiber optic coupler, along with the method for manufacturing it, is described in detail in co-pending patent application Ser. No. 300,955 filed Sept. 10, 1981, entitled Fiber Optic Directional Coupler by H. J. Shaw, et al. assigned to the assignee of the present invention. That co-pending patent application is hereby incorporated herein by reference. Nonetheless, a brief description of FIGS. 1 through 4 will be provided to permit an understanding of the essential characteristics of the fiber optic coupler.

The coupler 10 includes two strands, 12a and 12b, of a single mode fiber optic material mounted in longitudinal arcuate grooves 13a and 13b, respectively, formed in optically flat confronting surfaces 14a and 14b, respectively, of rectangular bases or substrates 16a and 16b, respectively.

Each of the strands 12a and 12b comprises a commercially available fiber of quartz glass which is doped to have a central core and an outer cladding. The applicant has found that the present invention works effectively with single mode fibers, which typically have a core diameter in the order of 10 microns or less, and a cladding diameter on the order of 125 microns.

The arcuate grooves 13a and 13b have a radius of curvature which is very large compared to the diameters of the strands 12. Thus the fiber optic strands 12a and 12b, when mounted in the grooves 13a and 13b, respectively, gradually converge toward the center and diverge toward the edges of the substrates 16a and 16b. At the centers of the substrates 16, the depth of the grooves 13 which mount strands 12 is less than the diameter of the strands 12, while at the edges of the blocks 16, the depth of the grooves 13 is preferably at least as great as the diameter of the strands 12. Fiber optic material is removed from each of the strands 12a and 12b to form respective oval shaped, planar surfaces 18a, 18b which are co-planar with the confronting surfaces 14a, 14b respectively, of the substrates 16a and 16b, respectively. In the embodiment shown, the coupler halves 10a and 10b are identical and are assembled by placing the confronting surfaces 14a and 14b of the substrates 16a and 16b together so that the surfaces 18a and 18b of the strands 12a and 12b are in facing relationship. An index matching substance (not shown), such as index matching oil, is provided between the confronting surfaces 14. This substance has a refractive index approximately equal to the refractive index of the cladding and also functions as a lubricant to prevent the optically flat surfaces 14 from becoming permanently locked together.

An interaction region 32 is formed at the junction of the strands 12. In this region 32 light is transferred between the strands 12a, 12b by evanescent field coupling. Furthermore, as explained in the above referenced copending patent application, when the spacing between the cores of the strands 12 is within a critical zone, each strand receives a significant portion of the evanescent field energy from the other strand and optimum coupling is achieved without significant energy loss. For a single mode fiber having a step index gradient, the critical zone can be quite narrow. In a single mode fiber of the type shown in FIGS. 1 through 4, for example, the required center-to-center spacing between the strands 12 at the center of the coupler is typically less than a few (for example, 2–3) core diameters.

Preferably the strands 12a and 12b are symmetrical through the interaction region 32 in the plane of the facing surfaces 18 so that the facing surfaces 18a and 18b are coextensive if superimposed.

The coupler 10 includes four ports labeled A, B, C and D in FIG. 1. If it is assumed that input light of a suitable wavelength (for example, 1.15 microns) is applied to port A, this light passes through the coupler and is output at port B and/or port D, depending on the amount of power that is coupled between the strands 12. In this regard, the term "normalized coupled power" is defined as the power ratio of the coupled power to the total output power. In the above example, the normalized coupler power would be equal to the ratio of the power at port D to the sum of the power output at ports B and D. This ratio is also referred to as the "coupling efficiency" and when so used is typically expressed as a percent. Thus, when the term "normalized coupled power" is used herein, it should be understood that the corresponding "coupling efficiency" is equal to the normalized coupler power times 100.

The coupler 10 operates on evanescent field coupling principles in which guided modes of the strands 12 interact through their evanescent fields to cause light to be transferred between the strands 12. As previously indicated, this transfer of light occurs at the interaction region 32. The amount of light transferred is dependent upon the proximity and orientation of the cores as well as the effective length of the interaction region 32. If the length of the interaction region 32 and the separation of the strands 12 within this region 32 are properly selected, light within the coupler will make only one transfer between the strands 12 as it travels through the interaction region 32. If the coupler is properly constructed, it is possible under such conditions to couple 100% of the light input at port A to port D. If the length of the interaction region 32 is further increased, or the separation between the strands 12 further reduced, a phenomenon referred to herein as "overcoupling" will occur in which the light will transfer back to the strand from which it originated. Several orders of "overcoupling" are possible. Thus, as the interaction length is still further increased or the separation is still further reduced, the light will make several transfers between the strands. This phenomenon is explained in detail in the incorporated copending application. Thus, the light may make multiple transfers back and forth between the two strands 12 as it travels through the region 32, the number of such transfers being dependent on the length of interaction region 32 and the spacing of the strands 12 within this region.

Referring now to FIG. 5, the incorporation of the fiber optic coupler 10 into a displacement transducer configuration is illustrated. In this configuration, the coupler substrate 16b is rigidly mounted within a frame or yoke 20 having a stepped, U-shaped channel 22. The lower portion 24 of the channel 22 is narrower than the upper portion 26 and is sized to rigidly mount the lower substrate 16b, with the bottom of substrate 16b resting on the bottom of the channel 22.

The step transition between the upper portion 26 and the lower portion 24 is below the confronting faces 14 of the coupler 10 so that the upper substrate 16a may be translated in a direction perpendicular to the channel 22 between the sidewalls forming the upper channel portion 26. The coupler 10 is oriented so that the strands 12a and 12b are in a direction parallel to the channel 22 to permit such translation to laterally offset the facing surfaces 18 (FIG. 1).

A cylindrically-shaped retainer 28 is slidably mounted to project from one sidewall of the upper portion 26 of the channel 22. This retainer 28 is spring biased to bear against one side of the substrate 16a. A differential micrometer 30 is mounted on the opposite sidewall of the channel upper portion 26. The micrometer 30 bears against the opposite side of substrate 16a so that the substrate 16 is held between the micrometer 30 and the spring biased retainer 28.

By turning the micrometer 30, the position of the substrate 16a may be adjusted relative to the substrate 16b to provide a home or starting position for the displacement measurement.

The upper substrate 16a mounts a projecting flange 32 which abuts a pushrod 34 mounted for reciprocal movement within a guide 36. The pushrod 34 may include an enlarged distal end 38 for mounting to an element whose displacement is to be measured.

As can be seen from FIG. 5, as the pushrod 34 is displaced to the left, as viewed in that figure, by the equipment to which it is connected, it bears upon the flange 32 and displaces the upper substrate 16a to the left, relative to the substrate 16b, overcoming the bias of the retainer 28 and displacing the substrate 16a away from the micrometer 30. This displacement, in turn, laterally displaces the strands 12 (FIG. 1).

The curve 40 of FIG. 6 graphically illustrates the effect of laterally offsetting the fiber facing surfaces 18 (FIG. 1) for a coupler having a minimum core spacing (when the surfaces 18 are superimposed) which provides a 50% coupling efficiency. As shown in FIG. 6, when the facing surfaces 18 of the fibers 12 are laterally offset in either direction from the superimposed configuration to increase the spacing between the strands 12, the coupled power gradually decreases to zero. A portion of this gradual increase is substantially linear and is denoted as the "dynamic range" 42 in FIG. 6. It will be understood, therefore, that if a coupler having the characteristics shown in FIG. 6 is utilized in the system of FIG. 5, the micrometer 30 will first be used to adjust the starting location of the upper substrate 16a to a location within the dynamic range 42. For example, the starting position may be at one end of that dynamic range 42 so that pressure on the pushrod 34 (FIG. 5) can adjust the position of the upper substrate 16a in a direction which utilizes the full dynamic range 42. Alternatively, if measurement of displacement in either direction is desired, the micrometer may be used to adjust the starting position so that it is in the middle of the dynamic range 42. It will be recognized that, as the pushrod 34 adjusts the position of the upper substrate 16a so that the coupling efficiency varies between approximately 20% and 40%, as shown in FIG. 6, the ratio of light output at ports B and D (FIG. 1) will vary linearly in relationship with the displacement of the substrate 16a. Thus, this ratio provides a direct linear measurement of substrate displacement.

Referring now to FIG. 7, the coupling efficiency is plotted versus displacement from zero (surfaces 18 superimposed) for a coupler having a minimum edge to edge core spacing which provides "overcoupling". Thus, when the upper substrate 16a (FIG. 1) is laterally offset from the lower substrate 16b by 9 microns, 100% coupling occurs. That is, light entering the coupler at port A will exit at port D, with virtually no light exiting at port B. When the strands are moved closer to one another, by displacing the upper substrate 16a toward a directly superimposed position above the substrate 16b, the light which was originally coupled from port A and strand 12a into strand 12b is recoupled into strand 12(A), so that, at a displacement of 5 microns, the coupling efficiency is zero, all of the light having been transferred from strand 12a to 12b, and all of the light having then been coupled back from strand 12b to strand 12a.

As the strands are moved even closer toward a superimposed position, so that their offset is two microns, 100% coupling efficiency is again achieved. That is, the light is transferred from port A and strand 12a to strand 12b, then back to strand 12a, and finally completely back to strand 12b to exit at port D.

By placing the fiber cores sufficiently close to one another, as by grinding and polishing the cladding of the strands 12a and 12b sufficiently to place the cores very near the surfaces 18, a larger order of "overcoupling" may be achieved. The "overcoupled" coupler which is illustrated in FIG. 7 will provide three separate dynamic ranges 46, 48 and 50, each substantially linear, on either side of the null or superimposed position. Each of these dynamic ranges may be used, selectively, for displacement measurements and each dynamic range 46-50 will provide a different transfer function or transducer constant.

The dynamic range 46 providing the greatest change in coupling efficiency versus horizontal displacement will provide the most accurate displacement measurements, the highest measurement resolution, but the lowest dynamic range. Conversely, the dynamic range 50 having the lowest slope will provide the widest linear displacement excursion of the three ranges 46 through 50, but the lowest resolution. Thus, by utilizing the micrometer 30 (FIG. 5) to adjust the coupler 10, a dynamic range 46-50 may be selected which provides the sensitivity and range required for a particular measurement.

It should be recognized that, in this particlar system, the three dynamic ranges 46–50 provide a linear displacement excursion of about 2, 3, and 4 microns, respectively, with a resolution of approximately 0.005 microns in each range.

Referring now to FIG. 8, an electrical system is shown for measuring the ratio of light output of ports B and D (FIG. 1) to provide a measurement of coupling efficiency, and to thus generate an electrical signal which is proportional to displacement. In the arrangement shown in FIG. 8, a laser diode 52 provides a continuous wave signal to the fiber optic coupler 10 and specifically to port A (FIG. 1). The outputs from ports B and D are connected, respectively, to detectors 54 and 56, each of which provides an output electrical signal proportional to the light intensity at ports B and D, respectively. The electrical signal output from the detectors 54, 56 are supplied to a ratio meter 58 which provides a direct measurement of the ratio between the output light at port D and the output light at both ports B and D. This output is supplied as an analog output for operating other equipment at 60 and as a digital display 62 for providing a direct display of displacement. It will be understood that the analog output 60 and digital display 62 may include a scaling factor or constant selected to provide direct displacement measurement in appropriate measurement units. The ratio meter 58, along with its analog and digital outputs, is a readily available electronic device well known in the prior art.

FIG. 9 provides a more accurate electronic system for measuring the detector output signals, and thus mechanical displacement. In this example, a laser diode 52 supplies light to port A of the fiber optic coupler 10, and the outputs at ports B and D are monitored by detectors 54 and 56 as in FIG. 8. Unlike FIG. 8, however, the laser diode 52 does not supply continuous light, but, rather, provides pulsed light output which is induced by a pulse generator 66 controlling a diode power supply 68. In a preferred exemplary embodiment, the pulse generator 66 may provide square wave pulses at a frequency of 2 kHZ so that the output from the laser diode 52 is modulated at a 2 kHZ rate.

The output from the pulse generator 66 is supplied, in addition, as a reference on line 69 to a pair of lock-in amplifiers 70 and 72, which are connected to the output of the detectors 54 and 56, respectively. The reference input 69 to the amplifiers 70 and 72 provides a timing signal for enabling these amplifiers 70, 72. The amplifiers 70, 72 are well known in the prior art and each provide a signal proportional to the average peak value of the output from the detectors 54, 56, respectively. Thus, by using the reference signal on line 69, the lock-in amplifiers 70, 72 will measure the peak output level from the detectors 54, 56 and will average this peak level over a predetermined number of cycles of the pulse generator 66. This number of cycles is adjustable on each of the amplifiers 70, 72.

The output from the amplifiers 70, 72 is supplied to a ratio meter 58 identical to the ratio meter described in reference to FIG. 6 to provide an analog output 60 and digital display 62 corresponding to the displacement of the upper substrate 16a (FIG. 1).

By selecting the integration time of the lock in amplifiers, that is, the number of cycles of pulse generator 66 which are averaged by each of the amplifiers 70, 72, the band width of the measurement may be adjusted. For example, an integration time of 1 second corresponds to a measurement bandwidth of 1 HZ centered about the pulse generator 66 frequency. This reduced bandwidth substantially reduces the noise signal contribution in the output to the ratiometer 58, and thereby increases the accuracy of the measurements, while reducing the minimum time period between successive measurements to, in this particular example, one second. That is, measurements are available only at a one second repetition rate. Thus, by properly adjusting both amplifiers 70, 72 to an integration time which provides only the required measurement repetition rate, the noise bandwidth may be substantially reduced, and the signal-to-noise ratio significantly increased, increasing the accuracy of the measurement. An operator may thus select a proper tradeoff between measurement accuracy and repetition rate to fit the requirements of a particular measurement.

From the preceding description, it can be seen that the fiber optic coupler provides a non-electromagnetic displacement measurement which is extremely accurate. Further, this single coupler is capable of providing more than one of dynamic measurement range, if the coupler is manufactured to provide "over-coupling".

What is claimed is:

1. A method of measuring the displacement of an object, comprising:
   illuminating a first end of a first optical fiber;
   juxtaposing said first optical fiber with a second optical fiber so that at least a portion of the light conducted by said first optical fiber is transferred to said second optical fiber, each of said fibers having a core surrounded by a cladding;
   relatively sliding said optical fibers, without deforming said claddings, in accordance with the displacement of the object; and
   measuring the light transferred between said two optical fibers to determine the displacement of the object.

2. A method of measuring the displacement of an object, as defined in claim 1, wherein said fibers each have a portion of the cladding removed to form a flat, oval surface, and wherein said moving step comprises sliding said flat, oval surfaces on said optical fibers to cause relative movement between said fibers.

3. A method of measuring the displacement of an object, as defined in claim 1, wherein said measuring step comprises:
   measuring the light output at a second end of said first optical fiber and measuring the light output at the corresponding end of said second optical fiber.

4. A method of measuring the displacement of an object, as defined in claim 3, additionally comprising:
   determining the ratio of said measured output at said corresponding end of said second optical fiber to the sum of said measured outputs at both said corresponding end of said second optical fiber and said second end of said first optical fiber.

5. A method of measuring the displacement of an object, as defined in claim 3, wherein said illuminating step comprises providing modulated illumination and wherein said light output measuring step comprises measuring the peak output of illumination at said second end of said first optical fiber and said corresponding end of said second optical fiber and integrating said peak output over time to reduce the bandwidth of said measuring step.

6. A transducer for measuring displacement, comprising:
   a fiber optic coupler having first and second optical fibers juxtaposed to form an overcoupled region in which light is optically coupled between said fibers, said optical coupling varying substantially linearly with said displacement for a plurality of displacement ranges, and in at least one of said displacement ranges said optical coupling increasing as the separation between said fibers increases;

means for displacing said first and second fibers within one of said displacement ranges in accordance with a displacement to be measured; and means for measuring said optical coupling between said fibers to determine said displacement.

7. A transducer, as defined in claim 6, wherein said measuring means comprises:

means for illuminating one of said first and second fibers in said coupler; and means for detecting the illumination from said one of said first and second fibers and the other of said first and second fibers.

8. A transducer, as defined in claim 7, additionally comprising:

a ratio meter for providing an output signal in accordance with said detecting means.

9. A transducer, as defined in claim 8, additionally comprising:

means for displaying the output of said ratio meter.

10. A transducer, as defined in claim 9, additionally comprising:

means for reducing the bandwidth of said measuring means to reduce the noise signal contribution at said measuring means.

11. A displacement transducer, comprising:

first and second optical fibers, said first fiber having an illuminating end and said second fiber having a measuring end, said first and second fibers juxtaposed to provide an overcoupled region in which light is coupled between said fibers such that the amount of coupled light increases as the separation between said fibers increases;

means for moving said fibers in accordance with a displacement to be measured;

means for illuminating said illuminating end of said first fiber;

means for measuring the illumination at the measuring end of said second fiber; and means responsive to said measuring means for indicating said displacement.

12. A displacement transducer, as defined in claim 11, wherein said first and second optical fibers are single mode optical fibers.

13. A displacement transducer, as defined in claim 11, additionally comprising a first block having a groove for mounting said first fiber, and a second block having a groove for mounting said second fiber, said grooves and fibers arranged in face-to-face relationship.

14. A displacement transducer, as defined in claim 13, wherein said first and second optical fibers are ground to remove a portion of the cladding of said fibers and to provide a planar surface of cladding coplanar with said blocks.

15. A displacement transducer, as defined in claim 14, wherein said means for moving said fibers comprises means for sliding said blocks relative to one another.

16. A displacement transducer, as defined in claim 15, wherein said means for moving said fibers slides said blocks in a direction perpendicular to the axis of said fibers.

17. A displacement transducer, as defined in claim 11, wherein said light coupling between said fibers occurs by evanescent coupling.

18. A displacement transducer, as defined in claim 11, wherein said overcoupled region provides plural dynamic ranges for said displacement transducer.

19. A displacement transducer, as defined in claim 11, wherein said overcoupled region comprises plural displacement ranges in which the amount of coupled light varies substantially linearly with the separation between said fibers, said transducer additionally comprising;

means for prepositioning said first and second optical fibers within one of said displacement ranges of coupling for said fibers.

20. An optical coupler apparatus for measuring a displacement within a predetermined range, said apparatus comprising:

first and second blocks having first and second grooves therein, respectively;

first and second optical fibers mounted in said grooves of said first and second blocks, respectively, said first and second fibers having a portion of the cladding removed therefrom to form first and second oval surfaces, respectively, coplanar with first and second surfaces on said blocks, respectively, said first and second surfaces juxtaposed to place said oval surfaces in facing relationship to form an interaction region in which light is coupled between said fibers, the coupling efficiency of said apparatus varying with displacement of said oval surfaces over said predetermined range;

means, between said surfaces of said blocks, for lubricating said blocks to prevent said blocks from binding;

means for sliding the surfaces of said first and second blocks relative to one another in accordance with the displacement to be measured to displace said oval surfaces;

means for measuring said coupling efficiency of said coupler apparatus; and means, responsive to said measuring means, for indicating said displacement.

21. A transducer for measuring displacement, comprising:

a first optical fiber having a first end, and a second optical fiber;

a light source for introducing light into said first optical fiber through said first end;

said first and second optical fibers juxtaposed to form a fiber optic coupler such that at least a portion of the light conducted by said first optical fiber is transferred to said second optical fiber, each of said fibers having a core surrounded by cladding;

a device for mounting said first and second juxtaposed fibers for relative sliding movement, without deforming said claddings, in accordance with the displacement to be measured; and a device for sensing said relative sliding movement, said sensing device including a detector for detecting light from one of said fibers.

* * * * *